United States Patent [19]

Schwemin

[11] 4,207,774

[45] Jun. 17, 1980

[54] DRIVE MECHANISM FOR PISTON ENGINES

[75] Inventor: Arnold J. Schwemin, Danville, Calif.

[73] Assignee: Energy Dynamics, Inc., Oakland, Calif.

[21] Appl. No.: 848,564

[22] Filed: Nov. 4, 1977

[51] Int. Cl.² ............................................. F16H 21/18
[52] U.S. Cl. ............................................................ 74/42
[58] Field of Search ........................................ 74/42, 44

[56] References Cited

U.S. PATENT DOCUMENTS

| | | | |
|---|---|---|---|
| 1,169,772 | 2/1916 | Chapman | 74/44 |
| 1,239,728 | 9/1917 | Schleppy | 74/44 X |
| 2,299,637 | 10/1942 | Martin | 74/44 |
| 2,417,910 | 3/1947 | Bruegger | 74/44 |

Primary Examiner—Albert W. Davis
Assistant Examiner—Wesley S. Ratliff, Jr.

Attorney, Agent, or Firm—Harris Zimmerman

[57] ABSTRACT

A drive mechanism for linking the pistons of a heat engine to a rotating drive shaft includes a housing through which the drive shaft extends in rotatable fashion. Secured to the drive shaft within the housing is a main bevelled gear. A plurality of bevelled drive gears engage the main gear, each drive gear being secured to a gear shaft which extends through the exterior of the housing. Secured to the exterior end of each gear shaft is a gear wheel, which meshes with a similar, freewheeling gear wheel. A pair of eccentric arms are secured to each pair of meshing gear wheels, their distal ends being secured to a block. A piston rod is also secured to the block, so that the reciprocal motion of the piston rod may be transferred through the eccentric arms and the gear wheels to the drive gear and the main gear.

6 Claims, 7 Drawing Figures

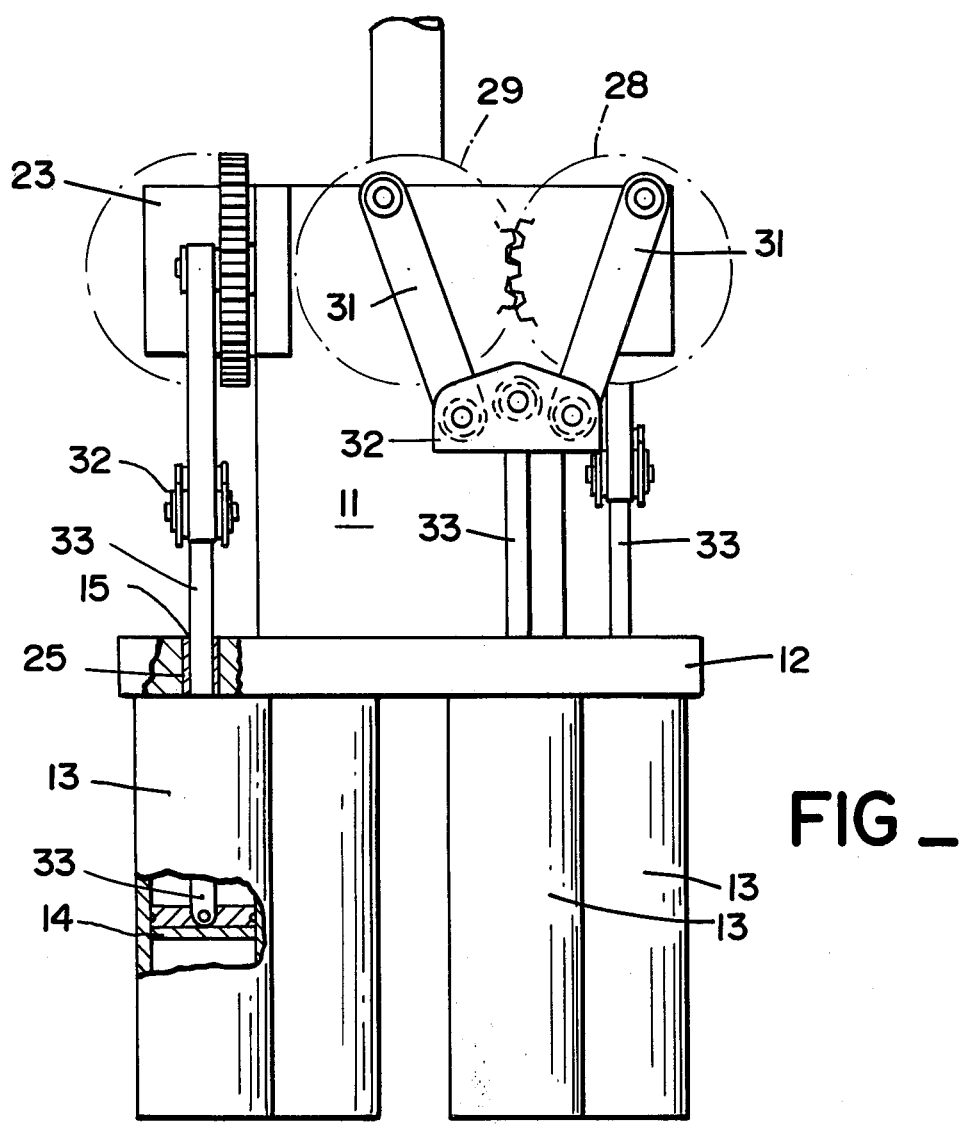
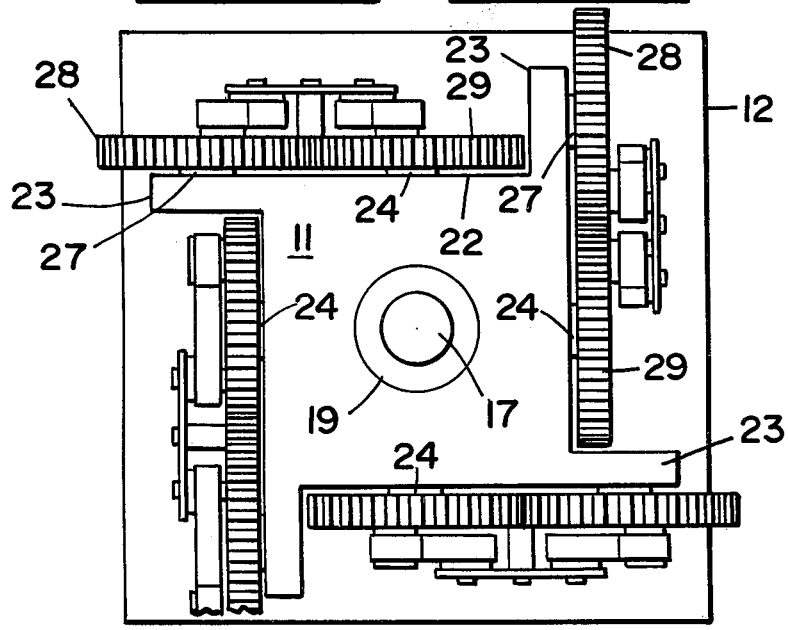

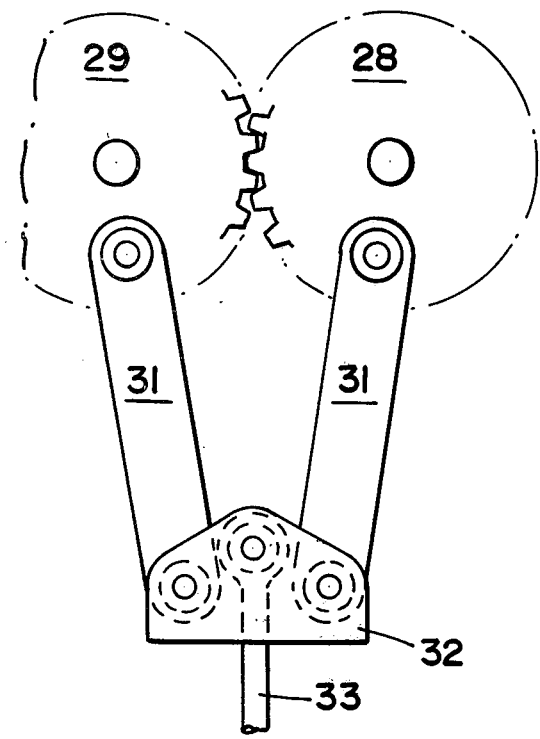
FIG_5
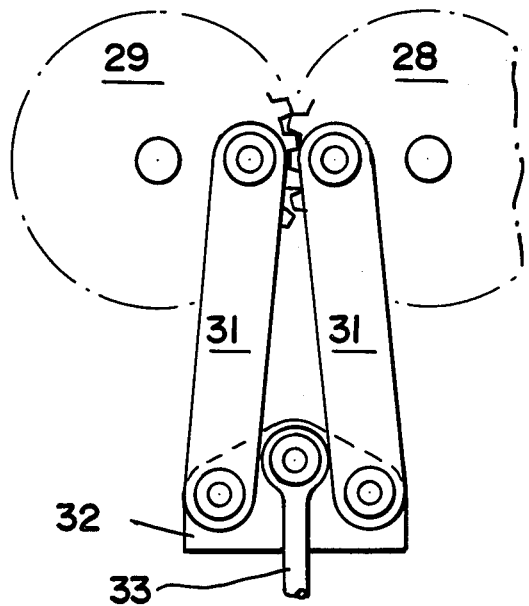
FIG_4
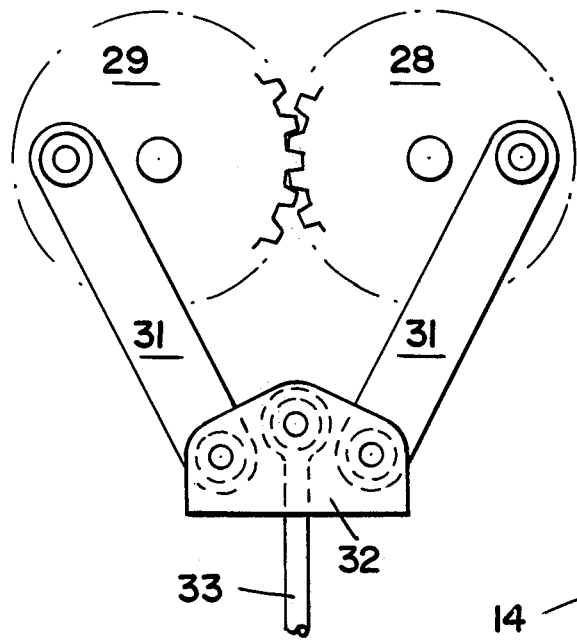
FIG_6
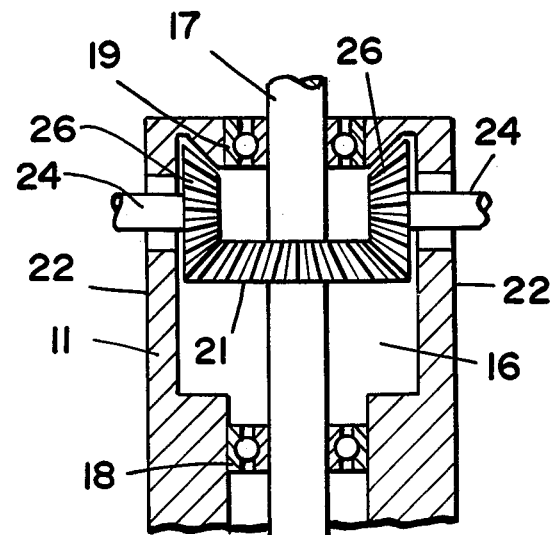
FIG_3
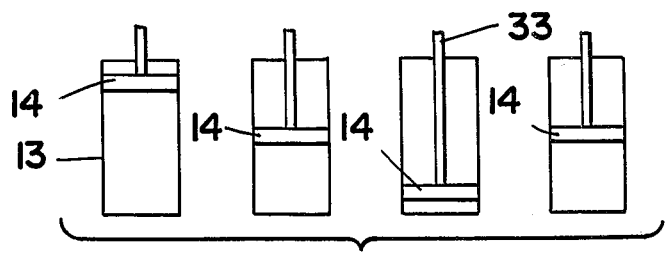
FIG_7

DRIVE MECHANISM FOR PISTON ENGINES

BACKGROUND OF THE INVENTION

In the field of heat engines, the piston engine has gained wide acceptance in the past century, primarily because of its reliability, controllability, and its desirable power output characteristics. Recently, interest has increased in external combustion piston engines, such as the Stirling cycle and Rankine cycle engines.

Typically, a piston is linked to a mechanism for transforming the reciprocating motion of the piston to smooth rotary motion. Often, this mechanism includes a piston rod extending from the piston to a crank on the crankshaft. The eccentric disposition with respect to the shaft enables it to accommodate the translational motion of the piston rod, and transform the periodic, reciprocating force provided by the piston into smooth rotational motion. Other mechanisms include swash plate and wobble plate devices.

It is well known in the art that the eccentric disposition of the crank of a crankshaft and the motion of a swash plate also causes the piston rod to undergo lateral motion as well as translational motion. This lateral motion is generally accommodated by a wrist pin which links the piston to the respective end of the piston rod. This mechanical system, however, does not entirely alleviate the side thrust which is attendant with the lateral motion of the piston rod. This side thrust, exerted on the piston through the wrist pin, causes uneven wearing of the piston rings, or similar seal, and a degradation of the seal disposed between the piston rod and the end of the cylinder. The side thrust also contributes to the wear of the main bearings which support the crank shaft.

Although the wear which is associated with the side thrust of the piston rod has been minimized by superior design, balancing, and machining, it still remains a significant factor in limiting the life span of an engine. The end of this lifespan is often determined by the time at which the engine must be rebuilt, including new piston rings, seals, bearings, and the like.

SUMMARY OF THE PRESENT INVENTION

The present invention generally comprises a drive mechanism for linking the pistons of a heat engine to the rotary output shaft thereof, and for converting the reciprocating motion of the pistons to the rotary power output of the output shaft. A significant aspect of the present invention is that it virtually eliminates the side thrust exerted on the piston rod and on the piston, and thereby eliminates a major cause of wear and prolongs the life of the engine. It also allows a simple slide seal on the piston rod to seal hydrogen or helium gas below the piston, as used in Stirling cycle engines.

The invention includes a housing having an output shaft extending therethrough, the shaft being supported by bearings journalled in the housing. A main bevel gear is secured to the output shaft within the housing, and it engages a plurality of drive gears also disposed within the housing. Each of the drive gears is secured to the proximal end of a gear shaft, the gear shaft extending through the wall of the housing to the exterior thereof and being supported by bearings journalled therein.

Secured to the distal end of each gear shaft is a gear wheel, which meshes with an idler gear disposed directly adjacent thereto. Extending eccentrically from the gear wheel and the idler gear are pair of eccentric arms, which are secured at their other ends to a connecting block.

Also secured to the connecting block is the distal end of the piston rod, the proximal end being secured to the piston itself. As the piston reciprocates the reciprocal motion is transferred through the piston rod to the connecting block. The block drives the eccentric arms which cause the gear wheel and idler gear to rotate. This rotational motion is transferred through the gear shaft to the drive gear and thence to the main gear. In this way the output shaft of the drive mechanism is driven in continuous rotational motion.

The piston rod undergoes direct translational motion along its axis, due to the equal arm effect of the eccentric linking members. Thus there is no side thrust exerted on the piston rod, or on the piston itself; and the wear of the piston, the piston rod, the piston rings or seals, and the cylinder walls is greatly reduced.

A BRIEF DESCRIPTION OF THE DRAWINGS

FIG. 1 is a plan view of the drive mechanism of the present invention, shown in conjunction with a piston engine.

FIG. 2 is an end view of the drive mechanism of the present invention.

FIG. 3 is a detailed, cross-sectional view of a portion of the drive mechanism of the present invention.

FIG. 4 is a detailed plan view of the dual eccentric arm feature of the present invention, shown in a disposition commensurate with the midpoint of the piston excursion.

FIG. 5 is a detailed plan view as in FIG. 4, shown in a position commensurate with the top dead center position of the piston excursion.

FIG. 6 is a detailed plan view as in FIGS. 4 and 5, shown in a disposition commensurate with the midpoint of the piston excursion.

FIG. 7 is a schematic depiction of various piston positions within its respective cylinder.

DESCRIPTION OF THE PREFERRED EMBODIMENT

The present invention generally comprises a drive mechanism, for use in conjunction with a piston engine, which links the pistons of the engine to the rotary output shaft thereof. The drive mechanism converts the reciprocal motion of the pistons to smooth rotary motion of the output shaft, and it exhibits the significant advantage of imparting no side thrust to the pistons or connecting rods of the engine. In describing the preferred embodiment, reference will be made to a four-cylinder heat engine, and the preferred embodiment will be described in relation thereto. However, the invention is not limited by the number of cylinders in the engine, nor by the type of heat engine with which it is used.

As shown in FIGS. 1 and 2, the drive mechanism of the present invention includes a generally rectangular housing 11 which is secured to one side of a base plate 12. Joined to the other side of the base plate are a plurality of cylinders 13. Within each cylinder 13 there is disposed a piston 14 which is driven by expanding gasses provided by external combustion of a fuel.

As shown in FIG. 3, within the housing 11 there is a cavity 16. Disposed in this cavity and extending out of the upper end of the housing 11 is a rotary output shaft 17. The shaft 17 is supported by at least a pair of bearings 18 and 19 to provide free rotation of the shaft 17. Supported on the shaft 17 within the cavity 16 is a main gear 21, of the bevel type, as shown in FIG. 3.

Extending into each side 22 of the rectangular housing 11 is a gear shaft 24, which is supported by needle bearings journalled in the side 22. Secured to the inner end of each gear shaft 24 is a bevelled drive gear 26 which meshes with the main gear 21. The gears 21 and 26 all have an even number of teeth. Thus all of the gears 26 and the shafts 24 rotate in synchronism with the gear 21 and the output shaft 17. The gears 21 and 26 may alternatively comprise spur gears, worm gears, or helical gears having any desired ratio of increase or decrease.

Extending outwardly from each of the sides 22 is a support arm 23. An idler gear shaft 27 is rotatably supported by the arm 23, and an idler gear 28 secured to the outer end of the shaft 27. Secured to the outer end of each of the shafts 24 is a gear wheel 29, which is disposed to mesh with the gear 28. The diameter and number of teeth of the gears 29 and 28 are identical.

Secured to each of the gear wheels 29 and idler gears 28 is an eccentric arm 31, all of the arms 31 being identical in length. Each of the arms 31 is secured to its respective idler gear or gear wheel by means of a stub shaft extending therefrom, and a needle bearing which provides for free rotation of the eccentric arm about the stub shaft. For each gear wheel and idler gear pair, there is provided one connecting block 32, to which the eccentric arms 31 of the respective gear pair are secured. The connecting block 32 is also provided with a pair of stub shafts and needle bearing assemblies so that the eccentric arms 31 may freely rotate with respect to the connecting block.

Also secured to each connecting block 32 is a piston rod 33 which extends from the connecting block to the piston 14 disposed in the cylinder 13 which is axially aligned with the respective connecting block. A suitably aligned port 15 in the plate 12 is provided for each rod 33 so that it may pass therethrough in freely rotation fashion. Each port 15 is provided with a sleeve or gland seal 25, such as those fabricated from lubricant impregnated plastic material.

It may be appreciated that the differential in pressure exerted on the opposed sides of the piston 14 causes it to reciprocate in the cylinder 13, as is well known in the art. The piston drives the associated piston rod 33 in reciprocal motion, translating along the axis of the piston rod. Likewise, the connecting block 32 is driven reciprocally by the piston rod 33. It should be noted that each pair of eccentric arms 31 are secured to their respective gear wheel and idler gear pair in exactly opposed relationship. That is, the shafts which connect the eccentric arms to their respective gears define a line which is always parallel to the line defined by the axes of rotation of the gear wheel and idler gear pair. Furthermore, each piston rod 33 extends along an axis which is midway between the rotational axes of its associated gear wheel and idler gear pair. Due to these symmetrical relationships, each connecting block 32 is maintained by its eccentric arms 31 on the axis which falls midway between its respective gear pair 29 and 28. Thus as the connecting block 32 and the piston rod 33 translate reciprocally and drive the gear pair 29 and 28 through the eccentric arms 31, they are prevented from undergoing any lateral, non-axial motion due to the action of the equally opposed eccentric arms.

As the piston 14 translates from top dead center through intermediate positions to the bottom dead center, as shown in FIG. 7, the gears 29 and 28 are driven by the eccentric arms 31 through commensurate rotational angles, as shown in FIGS. 4, 5, and 6. That is, the block 32 drives the eccentric arms 31 which cause the gear wheel 29 and the idler gear 28 to rotate. This rotational motion is transferred through the gear shaft 24 to the drive gear 26 and thence to the main gear 21. In this way the output shaft 17 of the drive mechanism is driven in continuous rotational motion. In all cases, however, the connecting block 32 and the piston rod 33 are maintained by the eccentric arms 31 on the same axis, so that the piston rods and connecting blocks undergo axial translation only. Thus, there is no side thrust imparted to the connecting block or piston rod, or piston rod seal 25, and therefore no side thrust is imparted by the piston rod 33 to the piston 14 itself.

Thus the mechanism of the present invention not only converts the reciprocal motion of the pistons 14 to rotational motion of the output shaft 17, it also alleviates any side thrust which might be exerted on the pistons and piston rod seals by the piston rods. In this way, a major cause of wear of the pistons, cylinder walls, and intermediate seals, is eliminated. Thus, the efficiency of the engine is increased, since compression within the cylinder is maintained over the operating life of the engine. Furthermore, the operating life of the engine is greatly extended, since the elimination of side thrust on the piston greatly reduces the wear thereof.

It should also be noted that each gear assembly 29 and 28 is dynamically balanced to alleviate any undue vibrational effects which might occur when the drive mechanism is operating at speed. Furthermore, each pair of eccentric arms 31 are also dynamically balanced, and close machine tolerances are observed in all phases of the construction of the present invention.

A significant advantage of the present invention is that the marked reduction in side thrust on the pistons and rods also reduces the lubrication requirements of the engine. Thus the gears and seals of the device may be permanently lubricated with suitable coatings or impregnations, and the typical oil pump, splash, or spray lube system eliminated. This is a significant advance for Stirling cycle engines in which the heat exchangers are often clogged and contaminated by lubricating oil leaking past the seals.

It should be emphasized that the piston engine forms no part of the present invention. Furthermore, the drive mechanism of the present invention may be employed with any form of reciprocating piston engine, including external combustion engines, steam engines, and the like.

I claim:

1. A drive mechanism for linking the reciprocating pistons of an engine to a rotating shaft, comprising a main gear disposed on said rotating shaft; at least one drive gear engaging said main gear; a piston rod extending from each of said pistons; a plurality of paired eccentric arms, each pair of which is joined at one end thereof to one of said piston rods; a plurality of gear wheels, each joined to one of said drive gears in common rotation therewith; a plurality of idler gears, each meshing with one of said gear wheels in paired relationship; and wherein each of the other ends of said each pair of eccentric arms is joined to one of a pair of said idler gears and said gear wheels.

2. The drive mechanism of claim 1, wherein all of said plurality of said eccentric arms are equal in length and are secured to said idler gear wheel pairs in symmetrically opposed relationship.

3. The drive mechanism of claim 1, wherein said gear wheels and said idler gears are all equal in diameter and number of teeth.

4. The drive mechanism of claim 1, further including a connecting block secured to said one end of said eccentric arms and said one end of said piston rods.

5. The drive mechanism of claim 1, wherein said main gear and said drive gears comprise bevel gears, and further including a plurality of gear shafts, each secured to one of said drive gears.

6. The drive mechanism of claim 5, wherein each of said gear wheels is secured to one of said gear shafts.

* * * * *